United States Patent
Yu

(10) Patent No.: US 8,760,080 B2
(45) Date of Patent: Jun. 24, 2014

(54) HYBRID MULTI-OUTPUT POWER SUPPLY AND REGULATION METHOD THEREOF

(75) Inventor: Tzu Ming Yu, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 133 days.

(21) Appl. No.: 13/527,805

(22) Filed: Jun. 20, 2012

(65) Prior Publication Data

US 2013/0009568 A1    Jan. 10, 2013

(30) Foreign Application Priority Data

Jul. 7, 2011    (CN) .......................... 2011 1 0190063

(51) Int. Cl.
    *H05B 37/02*    (2006.01)
(52) U.S. Cl.
    USPC .............................. 315/297; 315/192; 315/308
(58) Field of Classification Search
    CPC ..... H05B 33/0815; H05B 37/02; H05B 39/04
    USPC ...... 315/185 R, 186, 192, 291, 297, 307, 308
    See application file for complete search history.

(56) References Cited

U.S. PATENT DOCUMENTS

| | | | | |
|---|---|---|---|---|
| 2006/0255753 A1* | 11/2006 | Sawada et al. | ................ | 315/312 |
| 2008/0136350 A1* | 6/2008 | Tripathi et al. | ................ | 315/294 |
| 2010/0026208 A1* | 2/2010 | Shteynberg et al. | .......... | 315/297 |
| 2011/0043137 A1* | 2/2011 | Negley et al. | ................. | 315/297 |
| 2011/0292704 A1* | 12/2011 | Makino et al. | ................ | 363/126 |
| 2012/0187863 A1* | 7/2012 | Nonaka et al. | ................ | 315/291 |

FOREIGN PATENT DOCUMENTS

CN    102006698 A    4/2011
CN    102076151 A    5/2011

* cited by examiner

*Primary Examiner* — Tung X Le
(74) *Attorney, Agent, or Firm* — Michael C. Stephens, Jr.

(57) ABSTRACT

The present invention relates to a hybrid multi-output power supply and regulation method thereof. In one embodiment, a power supply includes: a driving circuit that generates an error signal based on an expected driving voltage, the expected driving voltage being determined by an LED load driving current, and where the driving circuit regulates the driving current to be substantially constant and consistent with an expected driving current; a first stage voltage regulator receiving an input voltage and the error signal, and generating a first regulation voltage consistent with the expected driving voltage, where the first regulation voltage supplies power to the driving circuit, and provides driving voltage for the LED load, and where the first regulation voltage provides sufficient expected driving current; and a second stage voltage regulator that receives the first regulation voltage, and generates a substantially constant second regulation voltage to supply power to a first load.

13 Claims, 7 Drawing Sheets

HYBRID MULTI-OUTPUT POWER SUPPLY AND REGULATION METHOD THEREOF

RELATED APPLICATIONS

This application claims the benefit of Chinese Patent Application No. CN201110190063.4, filed on Jul. 7, 2011, which is incorporated herein by reference in its entirety.

FIELD OF THE INVENTION

The present invention generally relates to the field of electronics, and more specifically, embodiments of the present invention pertain to a hybrid multi-output power supply, and a regulation method thereof.

BACKGROUND

With the rapid development and continuous innovation in the lighting industry, and the growing importance of energy savings and environmental protection, light-emitting diode (LED) based lighting has rapidly developed as a revolutionary lighting technology. However, the luminance of LED associated with the parameter of luminance intensity is in direct proportion with the current and forward voltage drop of the LED, and also varies with external temperature. Therefore, it is very important to select a substantially constant current generator to drive the LED lighting, and to maintain ideal luminance. The full advantages of LED lighting can only be achieved with optimum performance of the associated LED driver.

SUMMARY

Particular embodiments provide a hybrid multi-output power supply, and a regulation method thereof. In one embodiment, a power supply can include: (i) a driving circuit configured to generate an error signal in accordance with an expected driving voltage, where the expected driving voltage is determined by a driving current of the LED load, and where the driving circuit is configured to regulate the driving current to be substantially constant and consistent with an expected driving current; (ii) a first stage voltage regulator configured to receive an input voltage and the error signal, and to generate a first regulation voltage consistent with the expected driving voltage, where the first regulation voltage is configured to supply power to the driving circuit, and to provide driving voltage for the LED load, and where the first regulation voltage is sufficient to provide the expected driving current; and (iii) a second stage voltage regulator coupled to the first stage voltage regulator, and configured to receive the first regulation voltage, and to generate a substantially constant second regulation voltage to supply power to the first load.

In one embodiment, a regulation method for a hybrid multi-output power supply, can include: (i) detecting a status of an LED load to generate an expected driving voltage; (ii) generating an error signal in accordance with the expected driving voltage; (iii) generating, by a first stage voltage regulator, a first regulation voltage consistent with the expected driving voltage in response to the error signal and an input voltage; (iv) regulating a driving current of the LED load to maintain the driving current substantially constant and consistent with an expected driving current; (v) driving the LED load in a normal operation by using the first regulation voltage and the driving current; and (vi) generating, by a second stage voltage regulator, a second regulation voltage to drive a first load based on the first regulation voltage.

Embodiments of the present invention can advantageously provide several advantages over conventional approaches. For example, sufficient driving voltage for an LED load can be obtained through a single stage voltage conversion circuit. Other advantages of the present invention will become readily apparent from the detailed description of preferred embodiments below.

DETAILED DESCRIPTION

Figure 1:
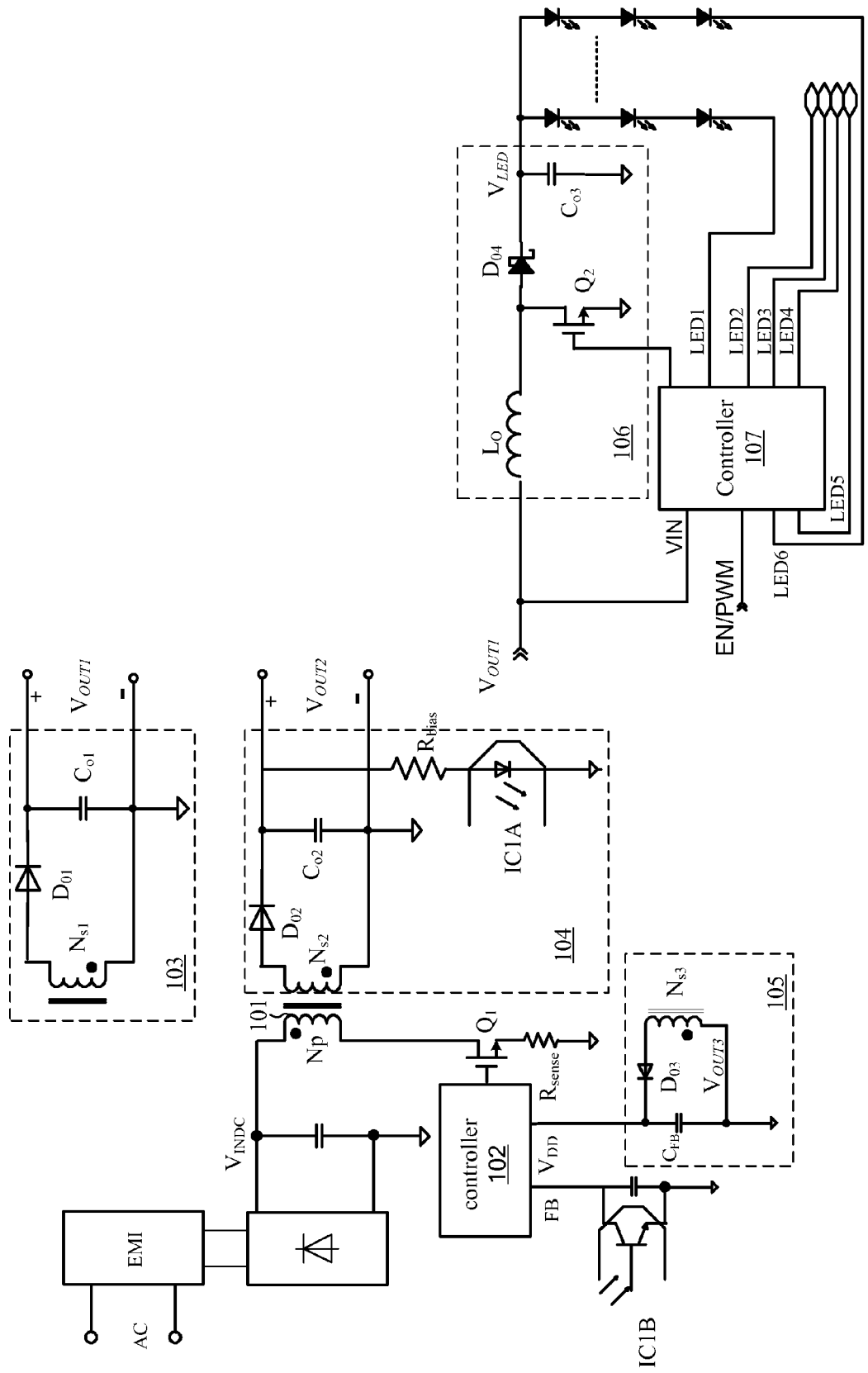
FIG. 1 shows a schematic diagram of an example LED driver.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to actively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. For example, a single stage voltage conversion circuit can be configured to obtain a driving voltage for a light-emitting diode (LED) load, which can simplify the circuit structure and controlling scheme, and decrease the overall cost. In addition, the output voltage can be regulated in accordance with feedback information representative of LED current by the voltage conversion circuit, which can be consistent with an expected driving voltage of the LED load to achieve maximum conversion efficiency, and a substantially constant driving current can be generated therefrom. In addition, a substantially constant voltage for the system or other loads can be supplied through a non-isolation voltage conversion to improve the transient response and simplify the circuit structure. Further, for LED drivers with standby mode, the power losses can be further decreased to improve efficiency.

In practice, the LED current can vary with temperature and other factors, such as dimming operation. If the first regulation voltage is maintained substantially constant, the power conversion efficiency can decrease. The first regulation voltage can be regulated in accordance with an error signal representative of the variation of LED current for the power supply, and may vary with the LED current and maintain the minimum voltage for driving the LED load to achieve the maximum and optimum power conversion efficiency. The invention, in its various aspects, will be explained in greater detail below with regard to exemplary embodiments.

Appropriate driving voltage and driving current may be provided by the LED driver to maintain normal operation of LED lighting. For a conventional LED driver, multiple outputs are usually provided, one of which can be configured to supply substantially constant current to LED lighting, and at least one of which can be configured to supply power to the system or other loads. Two stages are typically configured for the LED driver to output the substantially constant current, the first stage driving circuit can be configured to convert an AC voltage to the first stage voltage consistent with the expected driving voltage for LED lighting. Then, the first stage voltage may be converted to the expected driving current for LED lighting by the second stage driving circuit. In many applications, an independent substantially constant voltage may be generated as the system power supply of the second stage driving circuit.

With reference to FIG. 1, a schematic diagram of an example LED driver is shown. Here, the first stage driving circuit is implemented as a flyback voltage regulator. External AC voltage can be converted to a DC voltage $V_{INDC}$ by the EMI and rectifier, which can be coupled to the primary winding of the transformer 101. The switching operation of the power switch $Q_1$ can be controlled by the controller 102 in accordance with error signal FB to generate a corresponding square waveform voltage at each of the three secondary windings of the transformer 101, which can be filtered through the output diode and the output capacitor to generate corresponding output voltages $V_{out1}$, $V_{out2}$ and $V_{out3}$.

Here, the third output voltage $V_{out3}$ can be configured to supply the system power to the controller 102. The second output voltage $V_{out2}$ can be configured to supply substantially constant voltage to other loads. Also, the first output voltage $V_{out}$ can be configured to supply the system power to controller 107, and may be converted to an output voltage $V_{LED}$ by boost voltage regulator 106 to supply driving voltage to the following LED load. The boost voltage regulator 106 can include power switch $Q_2$, inductor $L_o$, diode $D_{O4}$ and capacitor $C_{O3}$.

Furthermore, other corresponding control, such as enabling or dimming control, can be implemented via controller 107 by enabling signal EN and controlling signal pulse-width modulation (PWM). From the above-mentioned description of the conventional LED driver as shown in FIG. 1, three output loops may be required, including three secondary windings, three diodes, three capacitors and rectifiers with electromagnetic interference (EMI) suppressor to provide driving voltage for the LED load and other controllers. However, disadvantages of this approach include a relatively complicated circuit, additional components, relatively complicated controlling scheme, and higher overall costs.

In addition, the two stage voltage conversion for driving voltage of LED load may increase the power losses and decreases the efficiency. In view that the output power of a substantially constant current driving circuit is usually higher than that of substantially constant voltage driving circuit, the conversion efficiency for the LED driver may thus be lower. An optical coupler formed by IC1A and IC1B may be configured to transfer the feedback of the substantially constant voltage driving circuit to controller 102, which may decrease the transient response. More output capacitors might be configured to achieve better regulation accuracy, but this can also increase the cost.

In one embodiment, a power supply can include: (i) a driving circuit configured to generate an error signal in accordance with an expected driving voltage, where the expected driving voltage is determined by a driving current of the LED load, and where the driving circuit is configured to regulate the driving current to be substantially constant and consistent with an expected driving current; (ii) a first stage voltage regulator configured to receive an input voltage and the error signal, and to generate a first regulation voltage consistent with the expected driving voltage, where the first regulation voltage is configured to supply power to the driving circuit, and to provide driving voltage for the LED load, and where the first regulation voltage is sufficient to provide the expected driving current; and (iii) a second stage voltage regulator coupled to the first stage voltage regulator, and configured to receive the first regulation voltage, and to generate a substantially constant second regulation voltage to supply power to the first load.

Figure 2:
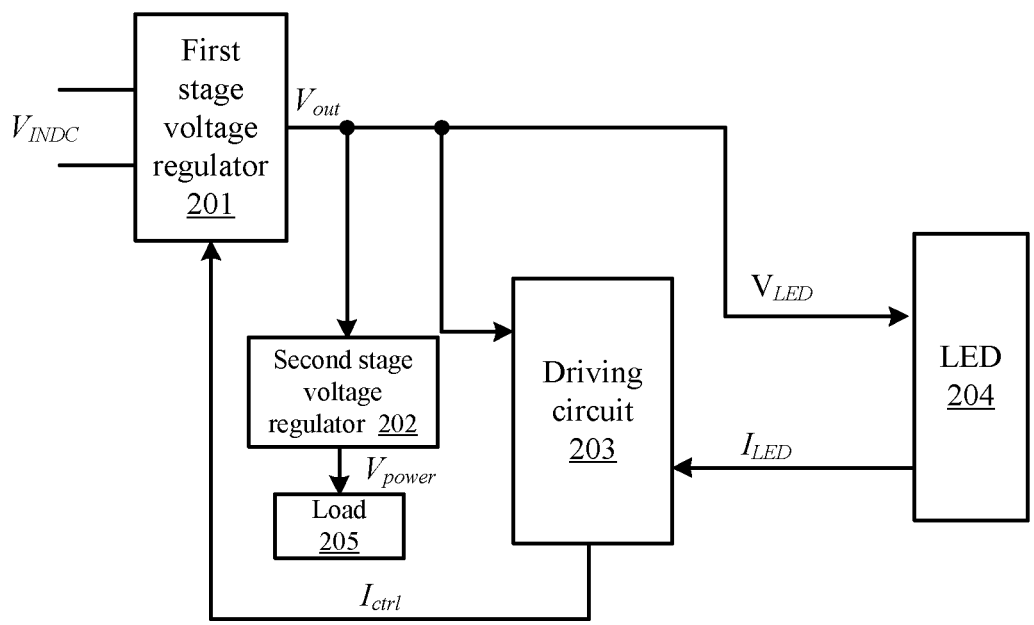
FIG. 2 shows a schematic diagram of a first example hybrid multi-output power supply in accordance with embodiments of the present invention.

Referring now to FIG. 2, a schematic diagram of a first example hybrid multi-output power supply in accordance with embodiments of the invention is shown. This example power supply can include first stage voltage regulator 201, second stage voltage regulator 202, and driving circuit 203. First stage voltage regulator 201 can be configured to convert the input DC voltage $V_{INDC}$ to first regulation voltage $V_{out}$ which can be transferred to LED load 204, driving circuit 203, and second stage voltage regulator 202.

Driving circuit 203 can be configured to receive real-time driving current $I_{LED}$ to obtain an expected driving voltage of the LED load 204. Then, an error signal $I_{ctrl}$ can be generated in accordance with the expected driving voltage and the first regulation voltage $V_{out}$, which can be transferred to the first stage voltage regulator 201. The first regulation voltage $V_{out}$ can be regulated to be consistent with the expected driving voltage in accordance with the error signal $I_{ctrl}$ by the first stage voltage regulator 201. In addition, first regulation voltage $V_{out}$ can maintain sufficient voltage to drive all LED strings 204 (e.g., the sum of driving voltages of all LED and the voltage drop of the current source of the string).

The real-time driving current $I_{LED}$ can be regulated to maintain a substantially constant level, and may be consistent with the expected driving current of the LED load 204. The first regulation voltage $V_{out}$ can be sufficient to provide the expected driving current. First regulation voltage $V_{out}$ can be regulated to generate the second regulation voltage $V_{power}$ by the second stage regulator 202 to supply power to the driving circuit 203, and/or other loads 205.

One skilled in the art will recognize that input DC voltage $V_{INDC}$ can be generated by the approach of FIG. 1, or other schemes. Any available topologies can be applied as to the first stage voltage regulator 201 and the second stage voltage regulator 202. In addition, LED load 204 can include one or more LED strings. More voltage conversion circuits like the second stage voltage regulator 202 can also be included in the hybrid multi-output power supply.

For the example hybrid multi-output power supply shown in FIG. 2 in accordance with embodiments of the present invention, only one stage voltage conversion circuit 201 can be configured to obtain the driving voltage for the LED load 204. Such approach can simplify the circuit structure and controlling scheme, and also decrease the cost. Further, first regulation voltage $V_{out}$ may be regulated in accordance with variation of the LED current to vary with the LED current and also maintain a minimum voltage to drive LED load 204, to achieve maximum and optimum power conversion efficiency.

Figure 3:
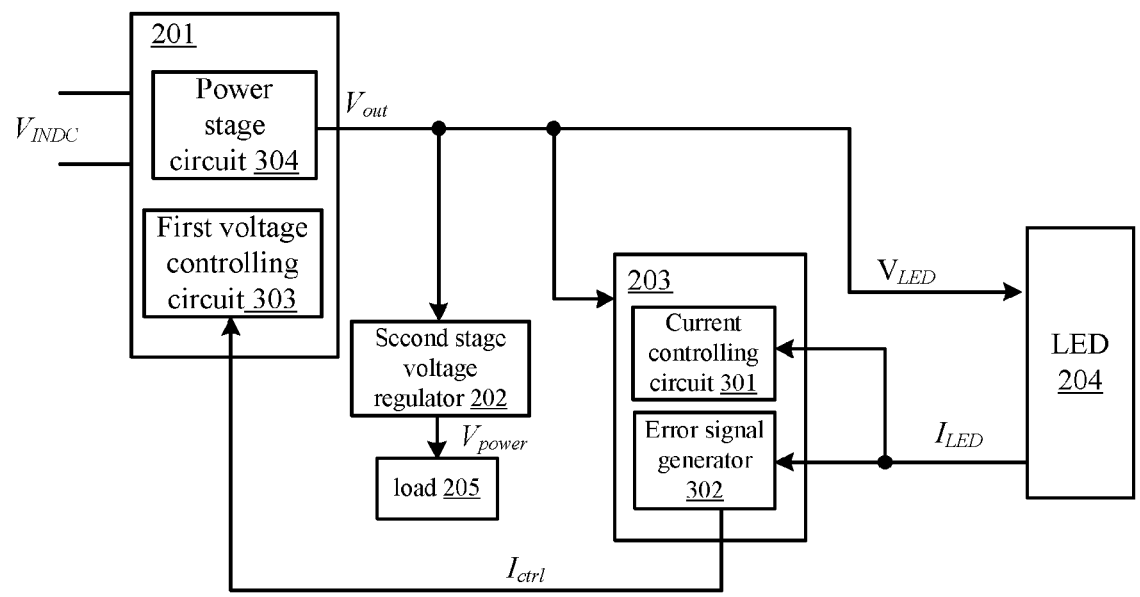
FIG. 3 shows a schematic diagram of a second example hybrid multi-output power supply in accordance with embodiments of the present invention.

Referring now to FIG. 3, a schematic diagram of a second example hybrid multi-output power supply in accordance with embodiments of the present invention is shown. On the basis of the example of FIG. 2, the driving circuit 203 can include current controlling circuit 301 and error signal generator 302. Also, first stage voltage regulator 201 can include power stage circuit 304 and first voltage controlling circuit 303. Current controlling circuit 301 can be configured to regulate and compensate real-time driving current $I_{LED}$ to maintain driving current that is substantially constant, and also maintain LED load 204 in normal operation.

Error signal generator 302 can be configured to calculate the expected driving voltage in accordance with real-time driving current $I_{LED}$. Then, the error signal $I_{ctrl}$ can be generated by comparing the expected driving voltage with the current driving voltage $V_{LED}$. The first voltage controlling circuit 303 can be configured to control the switching operation of the power switch of the power stage circuit 304 in accordance with the received error signal $I_{ctrl}$ to make the first regulation voltage $V_{out}$ substantially consistent with the expected driving voltage.

When LED load 204 includes a plurality of LED strings, error signal $I_{ctrl}$ can be generated in accordance with the maximum expected driving voltage of all LED strings to regulate the first regulation voltage $V_{out}$ to be consistent with the maximum expected driving voltage, and to provide enough driving voltage for all LED strings. Also, sufficient driving current can be provided by current controlling circuit 301 to drive LED load 204 on the basis of the first regulation voltage $V_{out}$. The operation principles of other parts of the example circuit may be substantially similar to those of the hybrid multi-output power supply as shown in FIG. 2.

For the hybrid multi-output power supply example of FIG. 3, the expected driving voltage can be obtained by detecting real-time driving current $I_{LED}$ of LED load 204, which can be then compared with the current driving voltage $V_{LED}$ to generate the error signal $I_{ctrl}$. Corresponding regulation can be implemented for the first stage voltage regulator by first voltage controlling circuit 303 according to the error signal $I_{ctrl}$ to maintain first regulation voltage $V_{out}$ substantially consistent with the expected driving voltage, to decrease the power losses and to optimally improve efficiency.

The hybrid multi-output power supply in particular embodiments can also include a controlling circuit to provide a dimming signal to driving circuit 203 to achieve a dimming operation of LED luminance. The expected driving voltage can be obtained in accordance with the dimming signal to generate the error signal. First regulation voltage $V_{out}$ of first voltage controlling circuit 303 can be regulated in accordance with the error signal to be substantially consistent with the expected driving voltage. The driving current of the LED load 204 can be regulated to be substantially constant and consistent with the expected driving current corresponding to the dimming signal. The first regulation voltage can be regulated in accordance with the real-time expected driving voltage to achieve maximum efficiency.

The hybrid multi-output power supply in particular embodiments can also include an enabling circuit to provide an enabling signal for the driving circuit. When the enabling signal is active, the real-time driving current $I_{LED}$ can be regulated by driving circuit 203 and LED load 204 may be in normal operation. When the enabling signal is inactive, driving circuit 203 and LED load 204 may both be disabled, or otherwise out of operation. During this time, second stage voltage regulator 202 may operate to convert the first regulation voltage $V_{out}$ to a substantially constant second regulation voltage $V_{power}$ to supply power to other loads.

When the enabling signal is inactive, no driving current may be generated. First regulation voltage $V_{out}$ can be regulated by first stage voltage regulator 201 in accordance with the error signal $I_{ctrl}$ such that an error between first regulation voltage $V_{out}$ and the expected driving voltage for the load 205 may be relatively small. In addition, power losses can be decreased to improve efficiency due to minor difference between input and output voltages of second stage voltage regulator 202.

The relationship between first regulation voltage $V_{out}$ and the expected output voltage for load 205 can be determined by the type of the second stage voltage regulator 202. For example, assuming that the expected output voltage for the load 205 is about 5V, when a buck topology is configured as the second stage voltage regulator 202, first regulation voltage $V_{out}$ can be slightly higher than about 5V (e.g., about 8V). When a boost topology is configured as the second stage voltage regulator 202, first regulation voltage $V_{out}$ can be slightly lower than 5V (e.g., about 3V).

Figure 4:
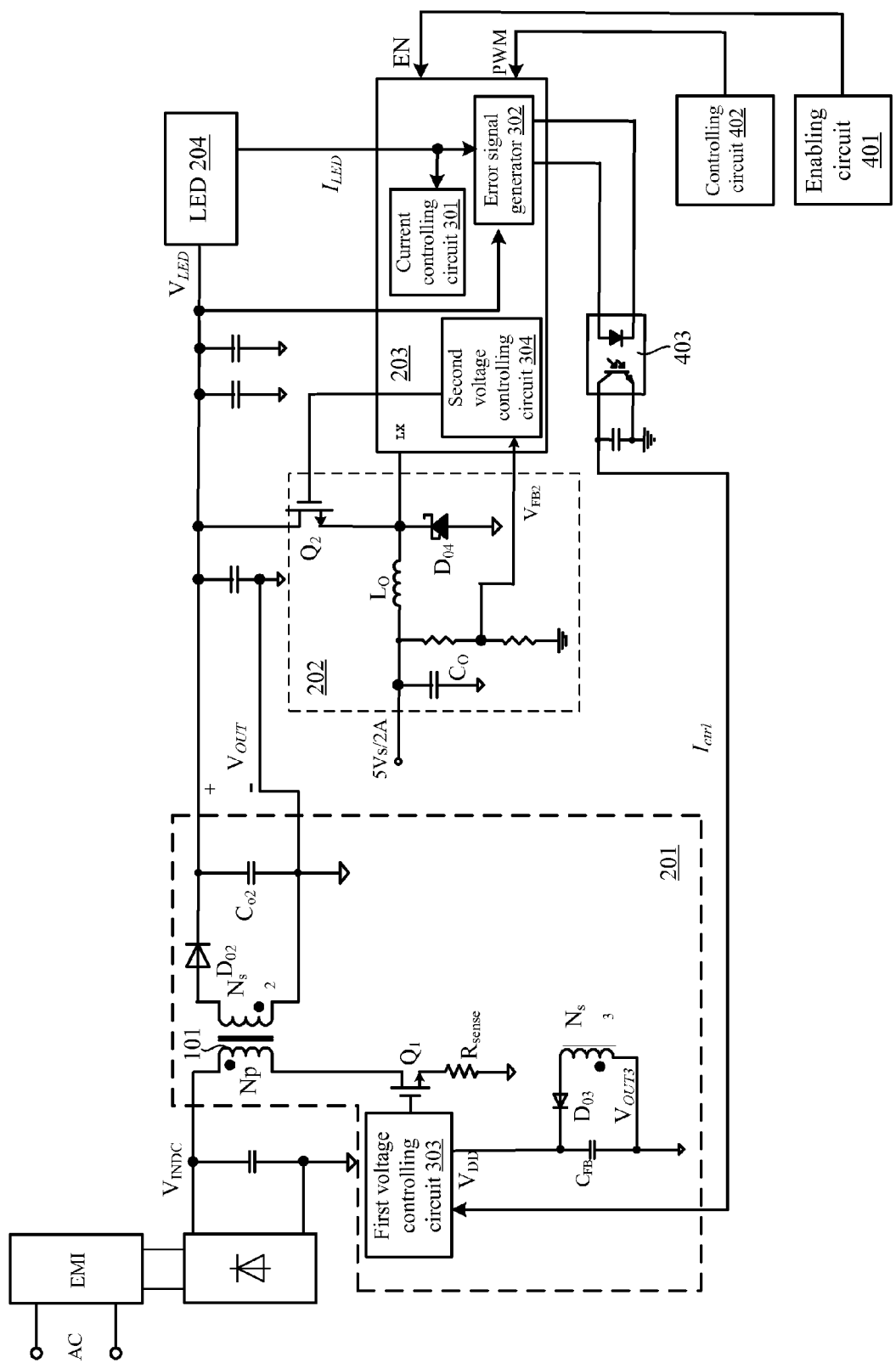
FIG. 4 shows a schematic diagram of a third example hybrid multi-output power supply in accordance with embodiments of the present invention.

Referring now to FIG. 4, a schematic diagram of a third example hybrid multi-output power supply in accordance with embodiments of the present invention is shown. Here, in view that the input voltage of the hybrid multi-output power supply is an AC voltage, an isolated voltage regulator can be configured as first stage voltage regulator 201. For example, a flyback voltage regulator can be configured as first stage voltage regulator 201, which can include a power stage circuit formed by power switch $Q_1$, transformer 101, output diode $D_{O2}$, and output capacitor $C_{O2}$, and first voltage controlling circuit 303 to generate first regulation voltage $V_{out}$. Driving circuit 203 can include current controlling circuit 301, error signal generator 302, and the second voltage controlling circuit 304, which may receive both enabling signal EN from enabling circuit 401 and controlling signal PWM from controlling circuit 402.

Example operation of the hybrid multi-output power supply can be divided into three conditions in accordance with the states of enabling signal EN and controlling signal PWM. In the first condition, when both enabling signal EN and controlling signal PWM are active, the luminance of LED load 204 can be regulated by regulation of controlling signal PWM. The expected driving voltage of LED load 204 can be generated in accordance with controlling signal PWM corresponding to a luminance by driving circuit 203, which can be compared with current driving voltage $V_{LED}$ to generate error signal $I_{ctrl}$. First voltage circuit 303 may receive error signal $I_{ctrl}$ through optical coupler 403 to control switching operation of power switch $Q_1$ in order to maintain first regulation voltage $V_{out}$ consistent with the expected driving voltage of LED load 204, through which power losses may be decreased to achieve maximum efficiency.

Current controlling circuit 301 can be configured to regulate the real-time driving current $I_{LED}$ of LED load 204 to maintain driving current substantially constant and consistent with the expected driving current, corresponding to the luminance represented by controlling signal PWM. First regulation voltage $V_{out}$ can be maintained to provide enough driving current for LED load 204.

The second operation condition is when the enabling signal is active, and the controlling signal PWM is inactive. During this condition, the luminance of the LED load 204 may not be required to be regulated. Error signal ($I_{ctrl}$) and first regulation voltage $V_{out}$ can maintain the values of the prior operation condition. Also, the driving current may not be regulated by current controlling circuit 301, but can be maintained substantially constant. The luminance of LED load 204 can maintain the luminance of the prior operation condition until controlling signal PWM recovers to active status, and the dimming may be again operable.

The third operation condition can be when both enabling signal EN and controlling signal PWM are inactive, and driving circuit 203, current controlling circuit 301, and LED load 204 are disabled, or otherwise out of operation. First regulation voltage $V_{out}$ of first stage voltage regulator 201 can maintain a substantially constant value to supply power to second stage voltage regulator 202 in accordance with error signal $I_{ctrl}$ from error signal generator 302.

A non-isolated voltage regulator can be configured as second stage voltage regulator 202 to decrease power losses and improve transient response, and as such the quantity of output capacitors and cost can be correspondingly reduced. In particular embodiments, second stage voltage regulator 202 can be selected as a buck voltage regulator, which can include power switch $Q_2$, output inductor $L_o$, output capacitor $C_o$, and zener diode $D_{o4}$. Driving circuit 203 can also include second voltage controlling circuit 304.

The switching operation of power switch $Q_2$ can be controlled by a controlling signal generated by comparing a reference voltage with feedback controlling signal $V_{FB2}$ that indicates the output voltage of the second stage voltage regulator 202, to maintain the output voltage substantially constant by second voltage controlling circuit 304 to supply power to other loads and driving circuit 203. For example, if the system power supply of the driving circuit 203 is about 5V, first regulation voltage $V_{out}$ can be slightly higher than 5V (e.g., about 8V), and the scope of the output voltage of first stage voltage regulator 201 can be from about 8V to the maximum driving voltage, as determined by the maximum luminance corresponding to controlling signal PWM. Here, current controlling circuit 301 and error signal generator 302 can be any available types of circuits to achieve current controlling and error generating functions.

Figure 5:
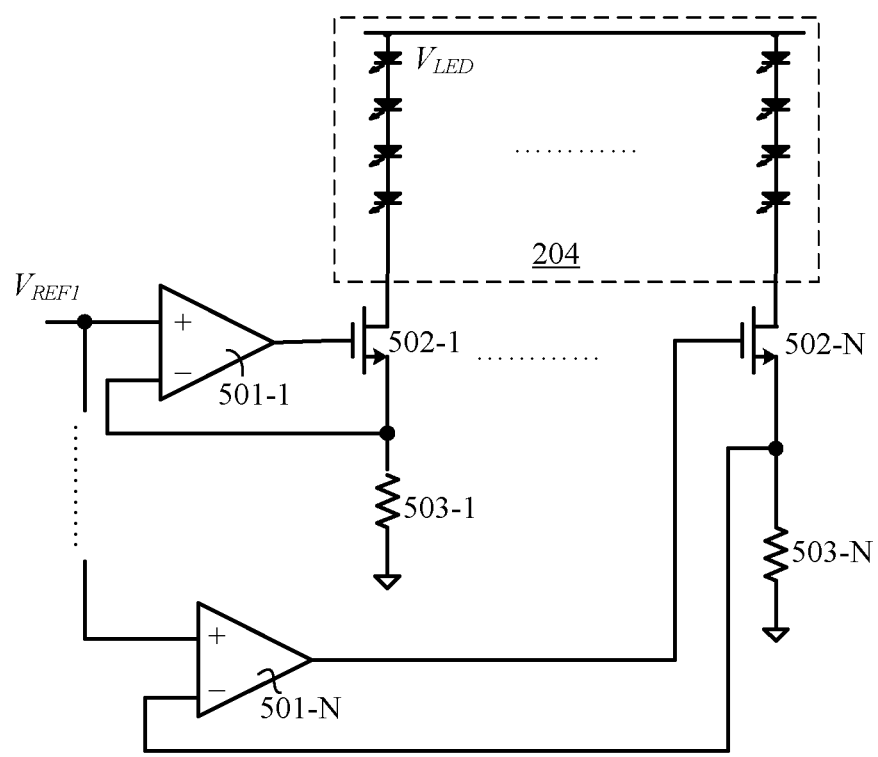
FIG. 5 shows a schematic diagram of a current controlling circuit in accordance with embodiments of the present invention.

Referring now to FIG. 5, a schematic diagram of a current controlling circuit 301 in accordance with embodiments of the present invention is shown. LED load 204 can include one or more branches represented as LED strings. Each branch of the current controlling circuit can be coupled to a corresponding LED string of LED load 204, which can include amplifier 501-1, transistor 502-1, and resistor 503-1. For example, transistor 502-1 can be a MOSFET transistor, and the non-inverting terminal of the amplifier 501-1 may receive a reference voltage $V_{REF1}$ representative of the expected driving current. Also, the output terminal can be coupled to a gate of transistor 502-1, and resistor 503-1 can be coupled between a common node of the inverting terminal of amplifier 501-1 and a source of the transistor 502-1. In accordance with the "virtual-short" principle of the amplifier, current flowing through resistor 503-1 can be a ratio of the reference voltage $V_{REF1}$ to resistor 503-1 to maintain the driving current of each LED string substantially constant. Similarly, other branches have the same or similar operations.

Figure 6:
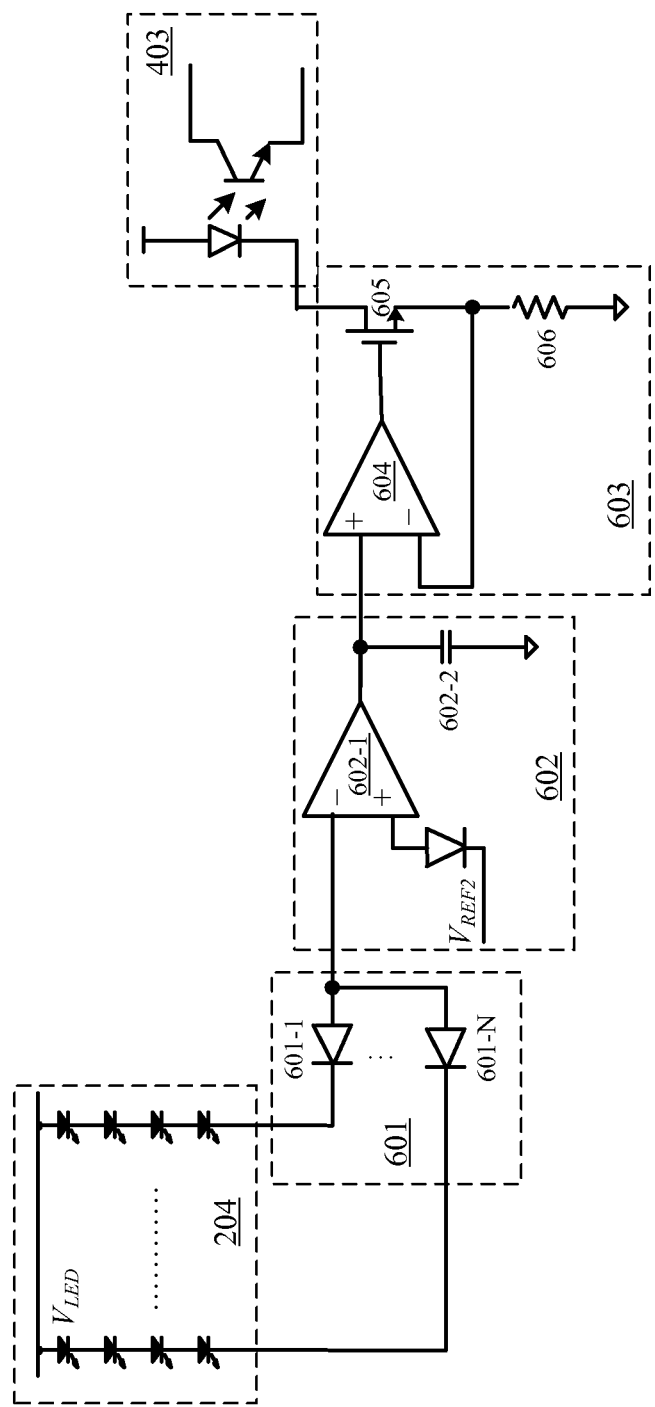
FIG. 6 shows a schematic diagram of an error signal generator in accordance with embodiments of the present invention.

With reference to FIG. 6, a schematic diagram of error signal generator 302 in accordance with embodiments of the present invention is shown. For example, the error signal generator can include selector 601, error calculator 602, and signal converter 603. Selector 601 can be coupled to LED load 204 to select the voltage information of the branch of LED load 204 that may require the maximum driving voltage, which can be compared with reference voltage $V_{REF2}$ representative of the expected driving voltage. The output of error calculator 602 can be converted by signal converter 603 and then transferred to optical coupler 403, through which the error signal can be transferred to first stage voltage regulator 201.

The selector 601 can include a plurality of diodes 601-1 to 601-N corresponding to each branch of LED load 204. The voltage information of the branch of LED load 204 requiring the maximum driving voltage can be transferred to error calculator 602. For example, error calculator 602 can include operational amplifier 602-1 and compensation capacitor 602-2. The inverting input terminal of operational amplifier 602-1 can receive the voltage information of the branch of LED load 204 requiring the maximum driving voltage, the non-inverting terminal can receive reference voltage $V_{REF2}$, and the output signal of operational amplifier 602-1 can be compensated by compensator 602-2.

Signal converter 603 can include operational amplifier 604, transistor 605, and resistor 606. The error signal of the branch of LED load 204 that may require the maximum driving voltage can be converted and transferred to first stage voltage regulator 201 through optical coupler 403. One skilled in the art will recognize that one or more processing circuits for enabling signal EN and/or controlling signal PWM can also be included by driving circuit, which can be any available circuits to achieve the enabling and dimming operations.

Hereinafter, an example regulation method for hybrid multi-output power supplies in accordance with embodiments of the present invention will be described. In one embodiment, a regulation method for a hybrid multi-output power supply, can include: (i) detecting a status of an LED load to generate an expected driving voltage; (ii) generating an error signal in accordance with the expected driving voltage; (iii) generating, by a first stage voltage regulator, a first regulation voltage consistent with the expected driving voltage in response to the error signal and an input voltage; (iv)

regulating a driving current of the LED load to maintain the driving current substantially constant and consistent with an expected driving current; (v) driving the LED load in a normal operation by using the first regulation voltage and the driving current; and (vi) generating, by a second stage voltage regulator, a second regulation voltage to drive a first load based on the first regulation voltage.

Figure 7:
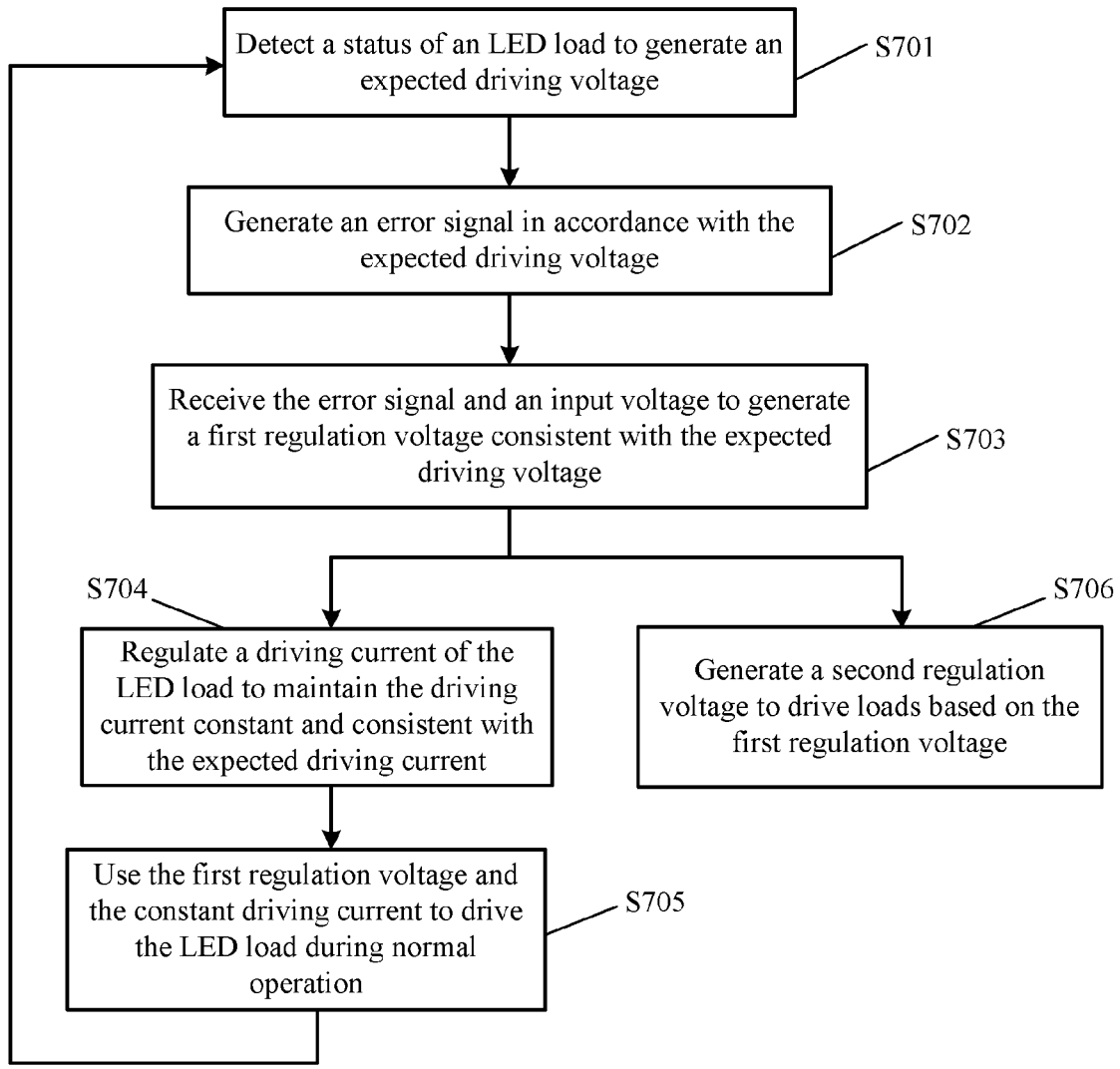
FIG. 7 shows a flow diagram of a regulation method for a hybrid multi-output power supply, in accordance with embodiments of the present invention.

Referring now to FIG. 7, a flow diagram of an example regulation method for hybrid multi-output power supplies in accordance with embodiments of the present invention is shown. For example, each such hybrid multi-output power supply may be configured to generate a substantially constant voltage to drive loads, and a substantially constant current to drive an LED load. At S701, a status of an LED load can be detected to generate an expected driving voltage. At S702, an error signal can be generated in accordance with the expected driving voltage of the LED load.

At S703, the error signal and an input voltage may be received and used to generate a first regulation voltage consistent with the expected driving voltage. At S704, the driving current of the LED load may be regulated to maintain the driving current substantially constant and consistent with the expected driving current. At S705, the first regulation voltage and the substantially constant driving current may be used to drive the LED load in a normal operation. At S706, a second regulation voltage to drive loads may be generated based on the first regulation voltage. In this way, driving voltage consistent with the expected driving voltage, and sufficient driving current may be provided to maintain normal operation of the LED load.

In addition, the expected driving voltage can be obtained by detecting the real-time driving current, and an error signal representative of the difference between the current driving voltage and the expected driving voltage can be generated to regulate the first regulation voltage consistent with the expected driving voltage. In this way, power losses may be decreased to achieve maximum efficiency.

Furthermore, an enabling signal may also be utilised to achieve on and off control for the LED load. When the enabling signal is active, the first regulation voltage consistent with the expected driving voltage in accordance with the error signal can be generated, and a substantially constant driving current can be generated to drive the LED load. When the enabling signal is inactive, the first regulation voltage can be maintained as a substantially fixed value, and a difference between the first regulation voltage and the second regulation voltage can be lowered.

In addition, a controlling signal may also be used to achieve dimming operation of the LED load. When the controlling signal is active, the first regulation voltage consistent with the expected driving voltage in accordance with the error signal can be generated and transferred to the driving circuit to generate substantially constant driving current that is consistent with the expected driving current to drive the LED load. When the controlling signal is inactive, the value of the first regulation voltage may be maintained as a prior value (e.g., when the controlling signal was active).

For example, first regulation voltage can be achieved by an isolated voltage regulation approach, and the second regulation voltage can be achieved by a non-isolated voltage regulation implementation. When the LED load is disabled or otherwise out of operation, a difference between the first regulation voltage and the second regulation voltage can be controlled to be relatively minor to achieve minimum power losses and maximum efficiency. Also, the example regulation method can include receiving the driving current of the LED load, and regulating the driving current to be substantially constant and consistent with the expected driving current through a feedback regulation.

As discussed herein, only a single stage voltage converter may be configured to generate the driving voltage in accordance with feedback information of the LED current. An error signal representative of the variation of the LED current can be generated to regulate the first regulation voltage, which can vary with the LED current and maintain a minimum voltage to satisfy all branches of the LED load to optimally improve power conversion efficiency.

The foregoing descriptions of specific embodiments of the present invention have been presented through images and text for purpose of illustration and description of the hybrid multi-output power supply and regulation method. They are not intended to be exhaustive or to limit the invention to the precise forms disclosed, and obviously many modifications and variations are possible in light of the above teaching, such as different implementations of the differentiating circuit and enabling signal generator.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hybrid multi-output power supply, comprising:
   a) a driving circuit configured to generate an error signal in accordance with an expected driving voltage, wherein said expected driving voltage is determined by a driving current of a light-emitting diode (LED) load, and wherein said driving circuit is configured to regulate said driving current to be substantially constant and consistent with an expected driving current;
   b) a first stage voltage regulator configured to receive an input voltage and said error signal, and to generate a first regulation voltage consistent with said expected driving voltage, wherein said first regulation voltage is configured to supply power to said driving circuit, and to provide driving voltage for said LED load, and wherein said first regulation voltage is sufficient to provide said expected driving current;
   c) a second stage voltage regulator coupled to said first stage voltage regulator, and configured to receive said first regulation voltage, and to generate a substantially constant second regulation voltage to supply power to a first load; and
   d) an enabling circuit configured to provide an enabling signal for said driving circuit, wherein said first regulation voltage is generated by said first stage voltage regulator in accordance with said error signal when said enabling signal is active, and wherein said first regulation voltage is maintained at a substantially fixed value when said enabling signal is inactive.

2. The power supply of claim 1, further comprising:
   a) a controlling circuit configured to provide a controlling signal to said driving circuit;
   b) wherein said error signal varies with said controlling signal, and said first regulation voltage is generated by said first stage voltage regulator in accordance with said error signal when said controlling signal is in a first condition; and
   c) wherein said first regulation voltage maintains a value of a prior condition when said controlling signal is in a second condition.

3. The power supply of claim 1, wherein said first stage voltage regulator comprises an isolated voltage regulator.

4. The power supply of claim 1, wherein said second stage voltage regulator comprises a non-isolated voltage regulator.

5. The power supply of claim 1, wherein said driving circuit comprises an error signal generator configured to generate said error signal representative of said expected driving voltage of said LED load.

6. The power supply of claim 1, wherein said driving circuit comprises a current controlling circuit configured to maintain said driving current of said LED load substantially constant and consistent with said expected driving current.

7. The power supply of claim 1, wherein said driving circuit comprises a second voltage controlling circuit configured to generate a second controlling signal in accordance with a voltage feedback signal indicating said second regulation voltage to maintain said second regulation voltage substantially constant.

8. A regulation method for a hybrid multi-output power supply, the method comprising:
   a) detecting a status of a light-emitting diode (LED) load to generate an expected driving voltage;
   b) generating an error signal in accordance with said expected driving voltage;
   c) generating, by a first stage voltage regulator, a first regulation voltage consistent with said expected driving voltage in response to said error signal and an input voltage;
   d) regulating a driving current of said LED load to maintain said driving current substantially constant and consistent with an expected driving current;
   e) driving said LED load in a normal operation by using said first regulation voltage and said driving current;
   f) generating, by a second stage voltage regulator, a second regulation voltage to drive a first load based on said first regulation voltage;
   g) generating said first regulation voltage by said first stage voltage regulator in accordance with said error signal when an enabling signal is active; and
   h) maintaining said first regulation voltage at a substantially fixed value when said enabling signal is inactive.

9. The method of claim 8, further comprising:
   a) varying said error signal with said controlling signal, and generating said first regulation voltage by said first stage voltage regulator in accordance with said error signal when a controlling signal is in a first condition; and
   b) maintaining said first regulation voltage at a value of a prior condition when said controlling signal is in a second condition.

10. The method of claim 8, wherein said first regulation voltage is generated through a non-isolated voltage regulation.

11. The method of claim 8, wherein said second regulation voltage is generated through an isolated voltage regulation.

12. The method of claim 8, wherein said first regulation voltage is regulated to be consistent with said expected driving voltage in accordance with said error signal.

13. The method of claim 8, wherein said driving current of said LED load is regulated to be consistent with said expected driving current.

* * * * *